United States Patent Office 2,940,966
Patented June 14, 1960

---

2,940,966

GLUCOSIDE OF 2-AMINO-4-HYDROXY-6-(1',2'-DIHYDROXYPROPYL)-PTERIDINE

Hugh S. Forrest, Jack E. Myers, and Chase van Baalen, Austin, Tex., assignors to Daniel R. Bullard, Clarence M. Malone, Wilfred T. Doherty, and Jesse Andrews, all of Houston, Tex., as trustees No Drawing. Filed May 15, 1958, Ser. No. 735,361

5 Claims. (Cl. 260—210)

---

This invention relates to a new pteridine compound and processes of preparing such compound. More particularly, it is concerned with a glucoside of 2-amino-4-hydroxy-6-(1',2'-dihydroxypropyl)-pteridine and with processes of preparing this product. The compound 2-amino-4-hydroxy-6-(1',2'-dihydroxypropyl)-pteridine has been given the name "Biopterin" in the trade and, for convenience, it will be sometimes so designated in the following specification and claims.

The compound falling within the scope of our invention is a valuable new compound which has value as a growth factor and it is useful as an intermediate in the synthesis of folic acid and of other vitamins and vitamin-type compounds and of Biopterin and glucose.

It is an object of the present invention to provide the hereinafter described compound which is characterized as an α glucoside of Biopterin. Another object is to provide processes for the preparation of said α glucoside of Biopterin. Other objects will be apparent from the following detailed description of our invention and the appended claims.

The new compound of our invention is believed to have the following formula:

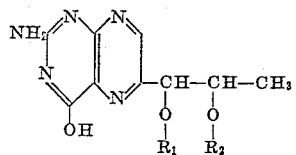

wherein $R_1$ and $R_2$ must be different and one is hydrogen and the other is glucose.

The α glucoside of Biopterin comprising our invention can be prepared by acid treatment of the bluegreen algae, Anacystis nidulans, at a temperature range of about 0–10° C. for a suitable period of time, preferably about two to three days for maximum yield, and isolating the compound from the medium surrounding the cells. The compound of our invention is the principal material obtained from the cells of Anacystis nidulans when they are killed with acid.

The algae, Anacystis nidulans may be grown in any suitable culture chamber; however, we presently prefer to use a large continuous culture chamber of the type described in detail in an article "Culture Conditions and the Development of the Photosynthetic Mechanism" by Jack Myers and L. B. Clark, published in the Journal of General Physiology, 28:103–112. By the use of this type of culture chamber, algae may be grown and caused to continuously multiply in an agitated suspension state. Cells may be harvested therefrom at convenient intervals by the withdrawal of samples of suspension containing algal cells in the culture medium. As is particularly described in an article by W. A. Kratz and Jack Myers, American Journal of Botany, 42:282 (1956), the culture medium may be any suitable medium to promote the growth of Anacystis nidulans, such as, for example, the "medium C" described in said article, aerated with 0.5% $CO_2$ in air, and may be supplemented with additional nitrogen by use of a suitable nitrogen source such as ammonium sulfate.

In the process of obtaining the glucoside of Biopterin of the present invention from Anacystis nidulans cells, the crude extract is obtained by acidifying the cells with dilute hydrochloric acid and a maximum yield of the subject compound can be obtained by allowing them to stand at approximately 0–10° C. for two to three days or longer, during which time the glucoside of Biopterin is released into the medium surrounding the cells. The algae cells are removed by filtering or centrifuging to produce a clear yellowish filtrate extract. The subject compound is isolated from the medium by any suitable purification process, such as : (1) adsorption of the subject compound on charcoal and elution with ethanol, 1% ammonia (1:1; 1 liter); (2) making the concentrated eluate 5% with respect to acetic acid; (3) adsorbing the subject glucoside of Biopterin from this solution on a Filtrol column and eluting it from the column after washing, with 20% acetone; (4) paper chromatographing the concentrated Filtrol column eluate, using n-propanol, 1% ammonia as solvent; (5) eluting the main fluorescent band from the paper with dilute ammonia; (6) concentrating the eluate and allowing it to stand to give a fluocculent precipitate; (7) separating said precipitate, and (8) recrystallizing the precipitated material from water to produce in substantially pure form the compound of the present invention. The chemical compound so produced is chromatographically homogeneous, but is microcrystalline.

Alternatively, and pursuant to a further embodiment of our invention, we have found that the compound of our invention can be obtained by the reaction of Biopterin with D-glucose in the presence of acid under anhydrous conditions. This reaction is conveniently effected by intimately contacting Biopterin with glucose under anhydrous conditions, for example, by dissolving Biopterin, glucose and p-toluene sulfonic acid in dimethylformamide. In a presently preferred embodiment of this process, the solution may be kept at 60° C. for about 48 hours to permit the reaction to proceed to equilibrium and we have found that the glucoside of Biopterin may be conveniently isolated from the solution by streaking it on a large sheet of filter paper and developing it chromatographically with butanol, acetic acid and water (4:1:1). After development, the fluorescent areas, corresponding to the areas of the said glucoside of Biopterin and Biopterin, are then eluted with dilute ammonia and the compound crystallized from water by evaporation of the ammonia and concentration of the solution.

The identification of the product obtained from either of the above processes can be ascertained by oxidation with alkaline permanganate to produce 2-amino-4-hydroxy-6-carboxypteridine, showing that it is a 6 substituted pteridine and, by way of further identification, acid hydrolysis of the subject compound produces Biopterin and glucose. The latter fractions, Biopterin and glucose, may be themselves identified by suitable analytical means. For example, Biopterin may be oxidized with alkaline permanganate to produce 2-amino-4-hydroxy-6-carboxypteridine, which is readily distinguishable as a 6 substituted carboxylic acid of 2-amino-4-hydroxy pteridine by the resulting sky blue fluorescence, ultraviolet spectrum and paper chromatographic behavior. The glucose fragment from the acid hydrolysis of the glucoside of Biopterin may be identified by demonstrating its reaction with the specific enzyme, glucose, oxidase. Additional evidence of structure is found in the fact that glucoside of Biopterin of the present invention is not attacked by β-glucosidase from almond emulsin, but it is readily split by an α-glucosidase made from Fleischman's active dry yeast. This further confirms the presence of glucose and shows that the linkage between one of the side-chain hydroxyls of Biopterin and the glucose radical is in the α configuration, which linkage may be represented as follows:

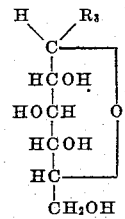

wherein $R_3$ represents the Biopterin radical linked to the glucose as previously indicated in the structural formula of the subject compound. From the data available, it has not been possible to specify which of the two hydroxyl groups of the Biopterin side chain is involved, and therefore the structure of the compound of this invention must be written in the tentative form of the structural formula previously discussed, in which one of the two symbols $R_1$ and $R_2$ is hydrogen and the other is glucose.

The following examples are illustrative of our processes of producing the α glucoside of Biopterin in accordance with the present invention.

EXAMPLE 1

*Reaction of Biopterin with D-glucose*

Biopterin (1 mg.), glucose (10 mg.) and p-toluene sulfonic acid (5 mg.) were dissolved in dimethylformamide (0.2 ml.). The solution was kept at 60° C. for 48 hours, when it was streaked on a large sheet of filter paper (Whatman No. 3 mm.). The developing solvent was butanol, acetic acid, water (4:1:1). After development, the fluorescent areas, corresponding to α glucoside of Biopterin and Biopterin were eluted, and the compounds thus obtained were checked paper chromatograpically against authentic compounds. A low yield (7%) of a compound identical chromatographically with the said α glucoside of Biopterin was obtained by this procedure, but a large quantity, greater than 50%, of the Biopterin was recovered and could be recycled.

EXAMPLE 2

*Preparation of α glucoside of Biopterin from an anacystis nidulans*

Anacystis nidulans was grown in a large continuous culture chamber on "medium C" supplemented with extra nitrogen as set forth in the article by W. A. Kratz and Jack Myers, American Journal of Botany, 42:282 (1956). The daily harvest of cells (5 g. dry weight in 1200 ml. medium) was acidified with 3 ml. of 6 N hydrochloric acid, pooled and allowed to stand for about two weeks at approximately 4° C. for convenience in collecting the cells and fluid. During this time most of the glucoside of Biopterin of the present invention was released into the medium. The whole (20 liters) was then filtered through celite and the clear yellowish filtrate mixed with charcoal (Darco G–60; 1 g./liter), and allowed to stand over night. Most of the charcoal settled out; the supernatant liquid was decanted, and the charcoal was collected by filtration. It was thoroughly washed with water and the blue fluorescent materials were eluted with ethanol, 1% ammonia (1:1; 1 liter). The charcoal eluate was evaporated to a small volume (20–50 ml.) and made 5% with respect to acetic acid. This solution was then passed through an acid activated montmorillonite (e.g. "Filtrol") column which had previously been washed and slurried in 5% acetic acid. The subject compound was absorbed on the upper portion of the column and, thereafter, the column was washed copiously with water. Finally, the blue fluorescent band consisting mostly of the α glucoside of Biopterin was eluted with 20% aqueous acetone.

The eluate was evaporated to small bulk and the solution streaked on two large sheets of heavy filter paper (23" x 23", S and S No. 470A). The sheets were irrigated with solvent (n-propanol, 1% ammonia; 2:1) and after drying, the main fluorescent band was cut out, and the material eluted from it with dilute ammonia. This solution was evaporated to small volume and allowed to stand, whereupon a flocculent precipitate was obtained. The precipitate was collected and recrystallized from water (yield, 10 mg.). The product was chromatographically homogeneous and microcrystalline. A further quantity of less pure material (about 20 mg.) was recovered by the addition of 10 volumes of acetone to the mother liquors.

The purification has been carried out many times using variations of the above procedure, including the use of magnesol instead of Filtrol in the absorption column. Also, the absorption column has been used before and after paper chromatography and different conventional solvent combinations have been used for the paper chromatography, including the use of dilute acetic acid as an alternative solvent for the n-propanol, 1% ammonia; 2:1 above. The results in each case were substantially the same as those set forth above.

The ultraviolet absorption spectrum of the subject compound was obtained by dissolving the purified material in 0.1 N sodium hydroxide and in 0.1 N hydrochloric acid. These absorption spectra resulted in maxima at 260 and 368 mu in 0.1 N sodium hydroxide and a maximum point at 320 mu in 0.1 N hydrochloric acid. These absorption spectra are very similar to the Biopterin spectrum clearly indicating that the compound is a 6-alkyl-2-amino-4-hydroxy pteridine.

The 6-substituted pteridine product did not melt below 250° C. and upon analysis of the material dried at 150° C., in vacuo, the results obtained were: C, 44.6; H, 5.8; N, 18.2%. $C_{15}H_{21}N_5O_8$ requires C, 45.1; H, 5.4; and N, 17.5%.

The ultraviolet absorption spectrum of the subject compound is that of a 6-alkyl-2-amino-4-hydroxy pteridine, so that the glucose must be attached to one or the other of the hydroxyl groups of the Biopterin side chain. Confirmation of this has been demonstrated by periodate oxidation of the subject glucoside of Biopterin whereby a slow uptake of 2 moles of the oxidant/mole was obtained all of which can be attributed to the oxidation of the glucose moiety.

In one acid hydrolysis of the subject compound a sample thereof (5 mg.) was hydrolyzed with sulfuric acid (2 N; 2 ml.) for 2 hours in a water bath. The acid was then neutralized with barium hydroxide and the precipitate was removed by centrifugation. After evaporation to a small volume (about 3 ml.), the clear solution deposited a white microcrystalline solid (2.5 mg.) which was collected and dried. This material was identical with authentic Biopterin as determined by paper chromatography, infrared spectrum and ultraviolet spectrum. Paper chromatography of the mother liquors demonstrated that glucose was released during the hydrolysis. Thus, acid hydrolysis in an aqueous medium of the subject compound, degraded it to 2-amino-4-hydroxy-6-(1',2'-dihydroxypropyl)-pteridine (Biopterin) and an aldehyde fraction which was identified as glucose. The latter identification of glucose was confirmed by demonstrating its reaction with the specific enzyme, glucose oxidase. Quantitatively, 1 mole of the subject compound gave 1 mole of Biopterin and 1 mole of glucose.

Various changes and modifications of the invention can be made and, insofar as such variations incorporate the true spirit of this invention, they are intended to be included within the scope of the appended claims.

We claim:
1. α Glucoside of 2-amino-4-hydroxy-6-(1'-2'-dihydroxypropyl)-pteridine having the glucose radical attached to a hydroxyl group of the dihydroxypropyl side chain.

2. A process of producing a pteridine compound characterized as a glucoside of 2-amino-4-hydroxy-6-(1',2'-dihydroxypropyl)-pteridine, said process comprising cultivating *Anacystis nidulans* in an aqueous culture medium, acidifying said cells with dilute hydrochloric acid, and maintaining said cells at approximately 4° C. until a substantial yield of said glucoside compound is produced in the medium surrounding said cells, separating said cells, and isolating the said glucoside compound therefrom.

3. A pteridine compound comprising a recovered product obtained from cells of *Anacystis nidulans* at approximately 4° C. in a dilute acid solution, the said compound being a blue fluorescent compound in aqueous solution, said compound being stable in alkali but hydrolyzing in acid in an aqueous solution to degrade quantitatively to 1 mole of Biopterin and 1 mole of glucose for each mole of said pteridine compound, and said pteridine compound having the general composition $C_{15}H_{21}N_5O_8$.

4. A process which comprises intimately contacting Biopterin with glucose in the presence of acid under anhydrous conditions to produce an α glucoside of Biopterin.

5. The process of claim 4 in which said Biopterin and glucose are intimately contacted in the presence of p-toluene sulfonic acid in a non-aqueous medium comprising dimethylformamide.

References Cited in the file of this patent

UNITED STATES PATENTS

| | | |
|---|---|---|
| 2,520,156 | Lindlar | Aug. 29, 1950 |
| 2,792,386 | Berger et al. | May 14, 1957 |

OTHER REFERENCES

Forrest et al.: Jr. Am. Chem. Soc. 77, 1955, 4865–9.